Figure 1:
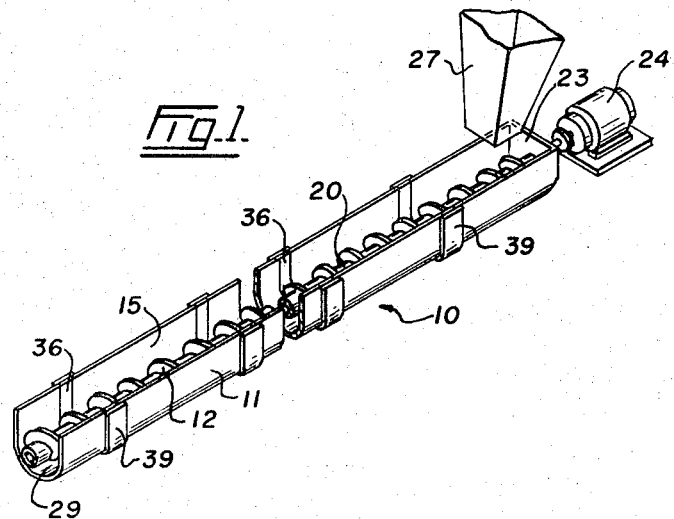

United States Patent [19]
Hume

[11] 3,845,856
[45] Nov. 5, 1974

[54] SCREW CONVEYOR FOR PARTICULATE MATERIAL

[75] Inventor: Alister C. Hume, Hudson Bay, Canada

[73] Assignee: MacMillan Bloedel Research Limited, Vancouver, British Columbia, Canada

[22] Filed: Dec. 27, 1972

[21] Appl. No.: 318,839

[30] Foreign Application Priority Data
Nov. 24, 1972 Canada.............................. 157384

[52] U.S. Cl. .............................................. 198/213
[51] Int. Cl. ......................................... B65g 33/00
[58] Field of Search............................. 198/213, 64

[56] References Cited
UNITED STATES PATENTS

| 902,530 | 10/1908 | Gustavsen.......................... 198/213 |
| 2,569,812 | 10/1951 | Hanna............................ 198/213 X |
| 3,306,433 | 2/1967 | Blanshine........................ 198/64 X |

*Primary Examiner*—Richard A. Schacher
*Assistant Examiner*—Douglas D. Watts
*Attorney, Agent, or Firm*—Fetherstonhaugh & Co.

[57] ABSTRACT

A screw conveyor including a spiral conveyor positioned within a trough, wear plates spaced along and projecting a little into the trough, and wear strips on the edge of the flight of the conveyor bearing against the wear plates and providing the sole supports for the spiral conveyor in the trough.

4 Claims, 4 Drawing Figures

PATENTED NOV 5 1974

3,845,856

SCREW CONVEYOR FOR PARTICULATE MATERIAL

This invention relates to screw conveyors for particulate material and the like.

Although this screw conveyor is designed primarily for wood wafers, flakes, chips, particles and the like used in the manufacture of particleboard and flakeboard, it may be used for other purposes as well.

In the manufacture of particleboard, one of the major problems is the transportation of the raw particulate material over relatively long distances without deteriorating the particulate material and with a minimum amount of pollution caused by fine particles escaping into the surroundings. In some plants, pneumatic transporting systems are used, in which the material is conveyed by air at relatively high volumes and velocities. This air transport results in a problem in removing the particles entrained in the air. As an alternative, some mills use conveyor belts, but particles fall off these belts and/or are carried along on the return runs of the belts and drop off at the supporting rolls or over roller bearings, again creating collection problems.

One method of avoiding these problems is to use screw conveyors or spiral conveyors. Up to now, these conveyors can be used only over short distances for the following reasons:

a. Since a spiral conveyor is supported by a center shaft, it tends to bow in the middle, resulting in the continual flexing of this shaft and therefore in a short life span.

b. If allowed to ride on the trough carrying the material, it may quickly wear through the trough material, and the spiral of the flight wears away.

c. When hanger bearings are used, the particulate material has a tendency to catch on the hangers and thereby plug up the conveyor.

d. In addition, when hanger bearings are used, the flights of the spiral conveyor have to be interrupted at the bearings and thus a discontinuous flow of the material cannot be avoided.

Another problem with screw conveyors is that they cannot readily be used on an incline over more than very short distances since hanger bearings are required and, as pointed out above, the particular material will collect at these bearings and very quickly plugs the conveyor. If the screw conveyors are used for vertical lifts, the screws are supported at the top and bottom only and are run at high speeds, resulting in high maintenance costs for the support bearings. Flexing of the shaft causes problems in jamming of the particles between the sides of the screw and the surrounding pipe or trough.

The present invention overcomes these problems in screw conveyors by providing a plurality of wear plates longitudinally spaced apart in a trough, and wear strips on the spiral edge of the flight of the spiral conveyor in the trough at these plates. The spiral strips ride on the plate, and the strips and plates provide the sole bearings for the conveyor within the trough. Thus, the spiral conveyor is supported at intervals throughout the length of the trough without anything to get in the way of the particulate material being moved along the trough. This permits the use of relatively small center shafts, allowing more space for movement of the particulate material in a trough of a given size. Most of the edge of the spiral flight is spaced a little from the inner wall of the trough so that there is no friction along the part of the edge and no jamming of the particulate material between the spiral conveyor and the trough. When wear does take place, it is a simple matter to replace the wear plates and wear strips, leaving the main components of the conveyor intact.

A screw conveyor in accordance with the present invention comprises a trough having a transversely curved inner surface along which particulate material is to be moved, a plurality of transversely curved wear plates in the trough and spaced apart longitudinally thereof, each plate having an inner surface spaced radially a little inwardly of the inner surface of the trough, a spiral conveyor in and extending longitudinally of the trough, said conveyor comprising a centre shaft and a spiral flight wound around and secured to the shaft, said flight having a spiral edge adjacent the inner surface of the trough, and a plurality of spacedapart wear strips extending along the spiral edge of the flight slidably bearing against the wear plates, said wear plates and strips maintaining the spiral edge of the conveyor clear of the trough inner wall and forming the sole support for the conveyor within the trough, whereby the spiral conveyor can move the particulate material through the trough without obstruction and with very little deterioration of said particulate material.

Figure 2:
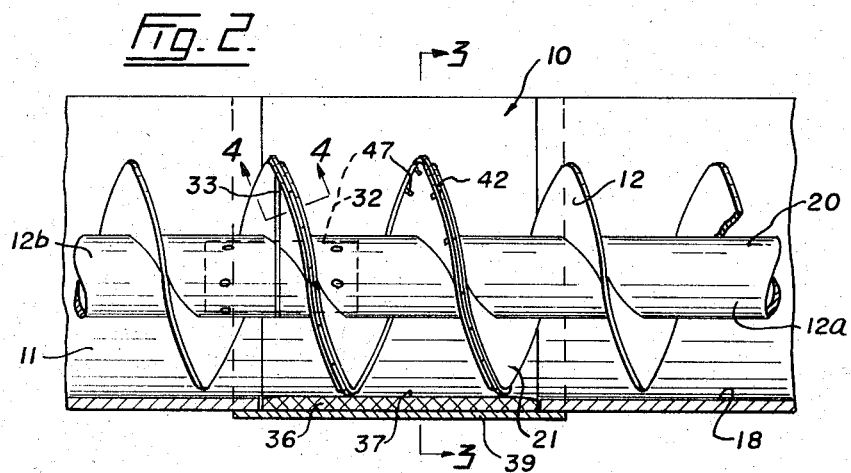
Figure 3:
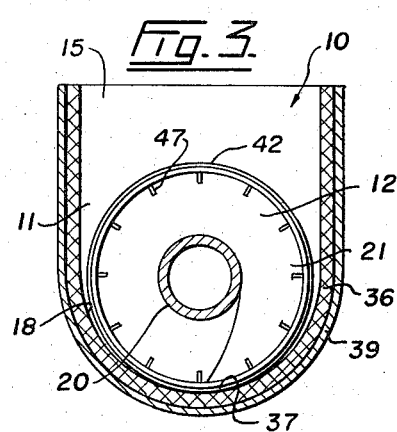
Figure 4:
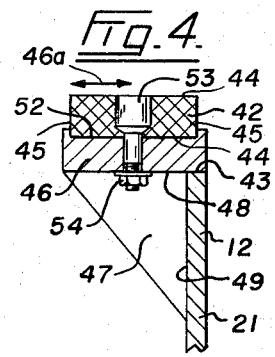

An example of this invention is illustrated in the accompanying drawings, in which FIG. 1 is a perspective view of a screw conveyor in accordance with this invention, FIG. 2 is an enlarged longitudinal section through a portion of a trough of the conveyor, FIG. 3 is a cross-section taken on the line 3—3 of FIG. 2, and FIG. 4 is an enlarged fragmentary section taken on the line 4—4 of FIG. 2.

Referring to the drawings, 10 is a screw-conveyor comprising a trough 11 with a spiral conveyor 12 in and extending longitudinally thereof. Trough 11 is shown open at its top 15, although it is to be understood that it may be in the form of a pipe, and the word "trough" is intended to include a closed trough or pipe. The trough has a transversely curved inner surface 18 extending from end to end thereof.

The screw conveyor 12 consists of a center shaft 20 with a spiral flight 21 wound around this shaft and secured thereto. The spiral conveyor 12 is driven or rotated in any suitable manner, and in this example, shaft 20 extends through the end 23 of the conveyor and is coupled to the drive shaft of an electric motor 24. The particulate material to be conveyed is directed into the trough 11 of conveyor 10 in any suitable manner, such as by a hopper 27. Conveyor 12 discharges the particulate material out to the open end 29 of the trough.

When the screw conveyor is relatively long, and this invention is primarily concerned with long conveyors, the spiral conveyor 12 is made in interconnected sections, sections 12a and 12b being shown in FIG. 2. The adjacent ends of the central shaft of the two conveyor sections abut each other, and are connected by a sleeve 32 which fits inside the two adjacent ends, as clearly shown in FIG. 2. As there are no hanger bearings in conveyor 10, the spiral flight 21 of sections 12a and 12b are made so that they come together at 33 and in effect are one continuous spiral flight.

A plurality of wear plates 36 are located in trough 11 each plate having transversely curved inner surface 37 which is spaced radially inwardly a little from the inner surface 18 of the trough. These wear plates are spaced apart longitudinally of the trough, and they are mounted therein in any desired manner. In this example, each wear plate 36 is in the form of an insert in the wall of the trough, and a cover plate 39 is secured to the outer surface of the wear plate and overlaps the adjacent portions of the outer surface of the wall of the trough, as clearly shown in FIG. 2. With this arrangement, the cover plates with the wear plates attached thereto can be easily removed from and inserted into the trough.

At each wear plate 36, the spiral flight 21 of the screw conveyor is provided with a wear strip 42 along its outer edge 43. Although these wear strips can be secured to the spiral edge 43 of the flight in any suitable manner, a preferred way of doing this is illustrated in FIG. 4. Each wear strip comprises a wide flat band having opposite flat sides 44 between its edges 45.

A flange 46 is secured to the edge 43 of flight 21 in each desired area thereof in any suitable manner. This flange extends transversely in the axial direction of the conveyor, as indicated by arrow 46a in FIG. 4. In this example, each flange has a plurality of webs 47 secured to its inner surface 48 and to the adjacent surface 49 of the flight by welding. The outer surface of each flange 46 has a groove 52 therein in which the spiral wear strip 42 fits, said strip being removably secured to the flange by a plurality of suitable bolts 53, one of which is shown in FIG. 4. Each bolt 53 has a nut 54 on its inner end. When it is desired to replace a wear strip 42, it is only necessary to remove the nuts 54 from bolts 53, at which time the wear strip can be lifted off flange 46, and another one placed thereon and secured thereto. It will be noted that one of the flat sides 44 of strip 42 bears against flange 46 while its opposite side 44 faces radially outwardly of the conveyor to bear against the adjacent wear plate.

As there is a wear strip 42 on the spiral conveyor at each wear plate 36 in the trough, the wear strips slidably bear against the wear plates, and these elements constitute bearings which support conveyor 12 in trough 11. These form the sole supports for the conveyor. As the inner surfaces 37 of the wear plates are spaced inwardly a little from the inner surface 18 of the trough, most of the spiral edge 43 of flight 21 is spaced a little from the trough inner surface.

During operation of screw conveyor 10, particulate material is fed from hopper 27 into the adjacent end of trough 11. The spiral conveyor 12 is rotated by motor 24, and the spiral flight 21 thereof moves the particulate material along the trough until it is discharged through open end 29. As there are no hanger bearings supporting conveyor 12, the particulate material is moved unobstructed through the trough so that it is subjected to very little damage therein and there is nothing to cause the material to pile up and plug the conveyor. The spiral conveyor being supported by the wear strips and wear plates does not depend upon shaft 20 for horizontal support and, therefore, this shaft can be of smaller diameter than is normally required. As the spiral flight is in effect continuous from one end of the conveyor to the other, the particulate material is not subjected to undue abrasion by the spiral flight.

Screw conveyor 10 is particularly useful for conveying particulate material through relatively long distances, and this has been done successfully up to 100 feet. The conveyor can be inclined upwardly or downwardly as required, and if the trough is in tube form, this conveyor can be used in a vertical position.

I claim:

1. A screw conveyor for particulate material, comprising a trough having a transversely curved inner surface along which particulate material is to be moved, a plurality of transversely curved wear plates in the trough and spaced apart longitudinally thereof, each plate having an inner surface spaced radially inwardly a little of the inner surface of the trough, a spiral conveyor in and extending longitudinally of the trough, said conveyor comprising a centre shaft and a spiral flight wound around and secured to the shaft, said flight having a spiral edge adjacent the inner surface of the trough, and a plurality of wear strips mounted on and extending along the spiral edge of the flight, said wear strips being longitudinally spaced apart and mounted on different portions of the spiral conveyor and there being one wear strip for and in sliding contact with each wear plate, said wear strips resting on the wear plates maintaining the spiral edge of the conveyor clear of the trough inner wall and forming the sole support for the conveyor within the trough; each of said wear strips comprising a flange secured to the spiral edge of said conveyor flight and extending transversely in the axial direction of the conveyor, and a wear strip removably secured to said flange, each wear strip comprising a wide flat band having opposite flat sides between edges thereof, and each wear strip being mounted with a flat side on the flange and a flat side facing radially outwardly of the conveyor to contact the adjacent wear plate; whereby the spiral conveyor can move the particulate material through the trough without obstruction and with very little deterioration of said particulate material.

2. A screw conveyor as claimed in claim 1 in which each wear strip is removably secured to the adjacent flange by bolts extending through the strip and said flange.

3. A screw conveyor as claimed in claim 1 in which said wear plates are removably secured in said trough.

4. A screw conveyor as claimed in claim 2 in which said wear plates are removably secured in said trough.

* * * * *